United States Patent [19]

Hattori et al.

[11] 4,236,491
[45] Dec. 2, 1980

[54] IGNITION TIMING CONTROL APPARATUS FOR INTERNAL COMBUSTION ENGINES

[75] Inventors: Tadashi Hattori, Okazaki; Kenji Goto, Susono; Daisaku Sawada, Susono; Takashi Shigematu, Susono; Hiroaki Yamaguchi, Anjo; Minoru Nishida, Okazaki; Teruyoshi Ito, Kariya, all of Japan

[73] Assignees: Nippondenso Co., Ltd., Kariya; Nippon Soken, Inc., Nishio; Toyota Jidosha Kogyo Kabushiki Kaisha, Toyota, all of Japan

[21] Appl. No.: 16,301

[22] Filed: Feb. 28, 1979

[30] Foreign Application Priority Data

Mar. 2, 1978 [JP] Japan ................................. 53-24077

[51] Int. Cl.$^3$ .......................... F02P 5/14; F02P 3/08
[52] U.S. Cl. .................................. 123/425, 123/435;
[58] Field of Search ....... 123/117 D, 117 R, 119 ED, 123/148 E, 146.5 A, 32 EA, 119 EC

[56] References Cited

U.S. PATENT DOCUMENTS

| 2,220,558 | 11/1940 | Van Dijck et al. | 123/119 ED |
| 3,972,310 | 8/1976 | Gambill | 123/148 E |
| 4,002,155 | 1/1977 | Harned et al. | 123/148 E |
| 4,044,236 | 8/1977 | Bianchi et al. | 123/32 EA |
| 4,054,111 | 10/1977 | Sand | 123/117 R |
| 4,106,447 | 8/1978 | West | 123/117 R |
| 4,120,272 | 10/1978 | Douaud et al. | 123/148 E |
| 4,133,475 | 1/1979 | Harned et al. | 123/117 D |
| 4,153,020 | 5/1979 | King et al. | 123/117 R |
| 4,161,162 | 7/1979 | Latsch et al. | 123/32 EA |

Primary Examiner—P. S. Lall
Attorney, Agent, or Firm—Cushman, Darby & Cushman

[57] ABSTRACT

An ignition timing control apparatus for an internal combustion engine detects the rotational angle and intake vacuum of the engine to control the ignition timing of the engine in accordance with the computation of computing means on the detected signals, and on the other hand the vibration of the engine is detected to detect the occurrence of knock and thereby to correct the ignition timing in response to the detection of knock. The control apparatus includes a vibration detector for detecting the vibration of the engine, and a knock control circuit for detecting the occurrence of knock when the ratio between the average value of the outputs of the vibration detector during a predetermined angle or a predetermined time interval before the maximum engine cylinder pressure value and that of the vibration detector during a predetermined angle or a predetermined time interval after the maximum engine cylinder pressure value, and the ignition timing of the engine is retarded in response to the occurrence of knock.

4 Claims, 16 Drawing Figures

IGNITION TIMING CONTROL APPARATUS FOR INTERNAL COMBUSTION ENGINES

BACKGROUND OF THE INVENTION

FIELD OF THE INVENTION

The present invention relates to an ignition timing control apparatus for internal combustion engines which functions so that the occurrence of knock is detected from the vibration, sound or the like caused inside and outside of the engine cylinders by their internal pressures and the ignition timing is retarded in response to the occurrence of a knock signal.

DESCRIPTION OF THE PRIOR ART

The ignition timing of an internal combustion engine must be determined in response to the engine conditions so as to ensure the optimum operation of the engine. With ignition timing control apparatus known in the art, it has been the general practice to time the ignition of an engine in response to the engine conditions as represented by the engine speed detected by a centrifugal advance mechanism and the intake vacuum detected by a vacuum advance mechanism.

It is known in the art that generally the ignition of an engine can be most advantageously effected at around a so-called MBT or the minimum advance for best torque from the engine efficiency and fuel consumption points of view, and the ignition timing must be changed to the MBT in response to the engine conditions.

Figure 1A:
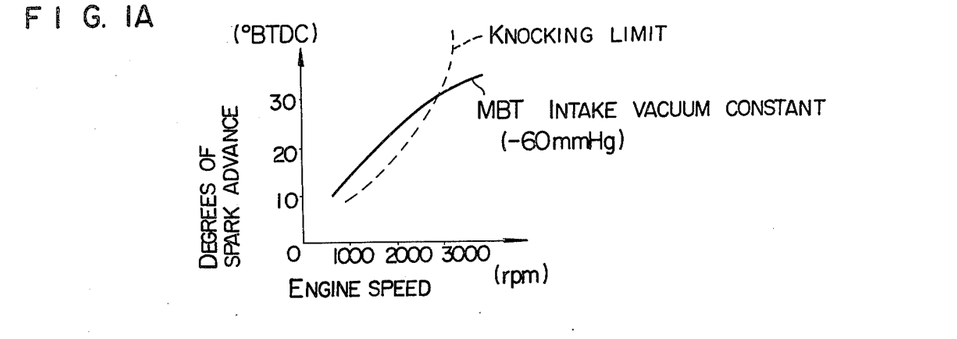
FIGS. 1A and 1B are characteristic diagrams showing the relationship between the MBT and the limit of knocking of an internal combustion engine.
Figure 1B:
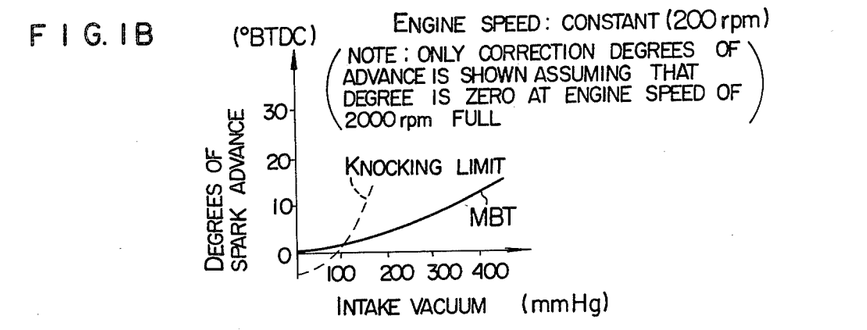

However, if the ignition timing is advanced under certain engine conditions, knock occurs thus making stable operation of the engine impossible. FIGS. 1A and 1B show the relationship between the MBT and the knocking limit, and the knocking limit is reached before the MBT under low speed and low load conditions. The knocking limit also tends to be influenced by the atmospheric conditions such as temperature, humidity, etc., and the known ignition timing control apparatus are programmed so that under all the operating conditions the ignition timing is retarded considerably with respect to the MBT in accordance with two parameters, i.e., the engine speed and the intake vacuum so as to prevent the occurrence of knock. As a result, the power output as well as the fuel consumption are held lower than the specified engine performance.

Figure 2:
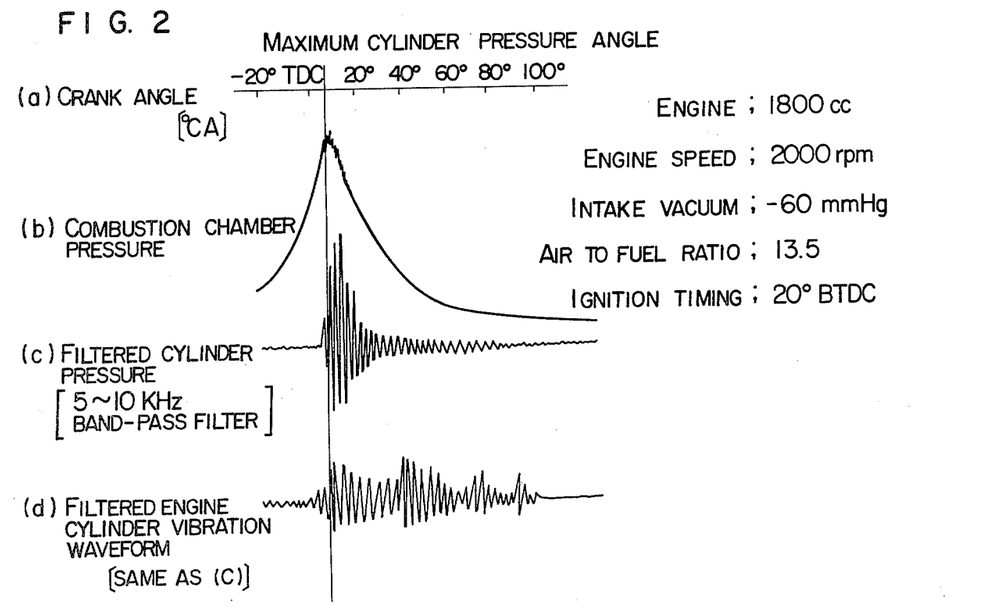
FIG. 2 is a waveform diagram useful for explaining the knock signals of the engine.

On the other hand, it is widely known that there exists a close correlation between the ignition timing and the cylinder pressure, and while under the nonknocking condition the cylinder pressure caused by the combustion of a mixture is not superposed by any of the harmonics (the frequency components ordinary in the range of 5 to 10 KHz, i.e., the components in a frequency band determined by the engine cylinder bore diameter and the velocity of sound caused by combustion and the components are caused by intermittent rapid combustion), when knock occurs so that the cylinder pressure approaches the maximum value the harmonics (FIG. 2) are superposed on the cylinder pressure and the pressure results in vibrations or sound outside the cylinder under the effect of the harmonics. Investigation of the internal pressure signals produced in the cylinders or the occurrence of vibrations or sound outside the cylinders has shown that the beginning of occurrence of knock (trace knock) is initiated at an engine crank angle at which the cylinder pressure reaches the maximum value and that with gradual increase in the intensity of knock (heavy knock) superposition of the harmonics on the cylinder pressure is initiated before (i.e., on the ignition side of) the maximum cylinder pressure value. Also under the effect of the harmonics superposed on the cylinder pressure the vibration or sound is brought to resonance with other vibrations and consequently the occurrence of vibration waveform is extended to the exhaust stroke. Such phenomena tend to become more apparent with increase in the intensity of knock.

SUMMARY OF THE INVENTION

With a view to overcoming the foregoing deficiencies, it is an object of the invention to provide an ignition timing control apparatus for internal combustion engines in which normally the ignition of an engine is timed in accordance with the engine conditions. However, when knock occurs, it is detected by a knock detecting circuit and the ignition timing is controlled by an ignition timing computing circuit in such a manner that the timing of ignition is retarded with respect to ignition timing under normal conditions, thus making it possible to prepare an ignition program which ensures the optimum ignition timing under all the engine conditions and also ensuring excellent performance from the power output and fuel consumption points of view by effecting the ignition at around the knocking limit only under the knocking conditions.

It is another object of the invention to provide an ignition timing control apparatus for internal combustion engines which is capable of detecting the occurrence of trace knock and accurately controlling the ignition timing with a very simple construction by virture of the recognition that trace knock of the knock level can be recognized to occur when the ratio between the outputs during certain angle degrees or time interval before and after the maximum cylinder pressure value angle is greater than a predetermined value.

Thus the apparatus according to the invention has among its great advantages the fact that the occurrence of knock is detected by a knock detecting circuit and the ignition timing is controlled in a manner to retard it so as to prevent the knock from increasing further, thus maintaining the ignition timing less than that for the detected knock level and thereby making it possible to program the ignition timing so that the ignition occurs at the optimum point under all the engine conditions, eliminating any rough operation due to knocking and improving the power output and fuel consumption. Another great advantage is that by virtue of the fact that the vibration of the engine is detected and the occurrence of trace knock is detected when in accordance with the detected vibration the ratio between the average output levels during certain angle degrees or time interval before and after the maximum cylinder pressure value angle is greater than a predetermined value, the noise signals are averaged and consequently the occurrence of trace knock is detected accurately and quickly utilizing the maximum cylinder pressure value angle as a threshold, practically without being affected by the noise signals.

DESCRIPTION OF THE PREFERRED EMBODIMENT

Figure 4:
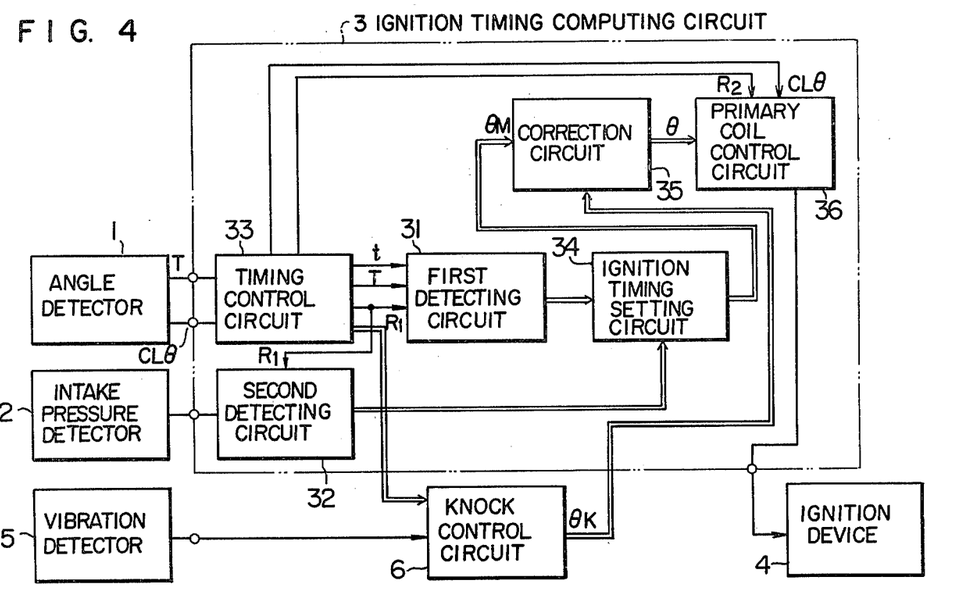
FIG. 4 is a block diagram showing an embodiment of an ignition timing control apparatus according to the invention.

The present invention will now be described with reference to the illustrated embodiment. Referring to the block diagram of FIG. 4 showing an embodiment of the invention, numeral 1 designates an angle detector mounted on the distributor shaft of a four cylinder, four cycle internal combustion engine and adapted to generate for each revolution both 4 reference signals T each having a predetermined angular period $T\theta$, and 720 angle signals $CL\theta$, 2 an intake pressure detector for detecting engine intake vacuum, 3 an ignition timing computing circuit connected to the angle detector 1 and the pressure detector 2 to determine an ignition timing in response to the engine conditions, and 4 an ignition device connected to the ignition timing computing circuit 3 to ignite the respective cylinders of the engine according to the computed ignition timing.

Numeral 5 designates a vibration detector for detecting vibration, such as a piezoelectric type vibration detector (a detector in which a piezoelectric element is used to generate an electric output corresponding to a straining force when the element is subjected to strain) or generator type vibration detector (a detector in which vibration is detected by a combination of a magnet and a coil), and the detector 5 detects the vibration acceleration of the engine or the variation in the cylinder pressure. Numeral 6 designates a knock control circuit connected to the vibration detector 5 to detect a knocking condition from the detected vibration acceleration or cylinder pressure variation and thereby to generate an ignition timing correction signal corresponding to the knock intensity.

Figure 5:
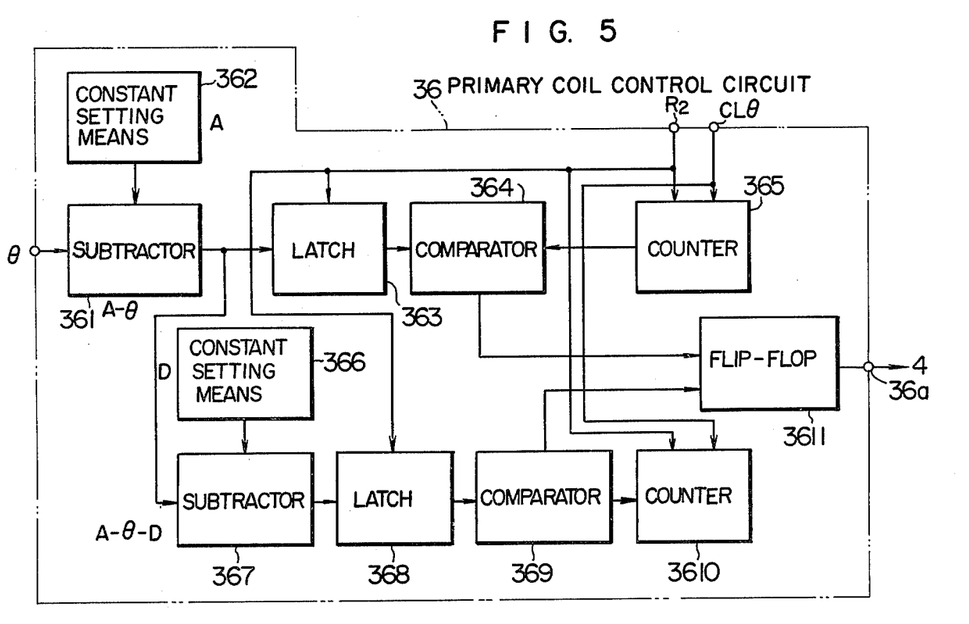
FIGS. 5, 6 and 10 are circuit diagrams showing the principal parts of the apparatus shown in FIG. 4.

The ignition timing computing circuit 3 comprises a timing control circuit 33 for generating various timing signals, a first detecting circuit 31 for detecting the engine speed, a second detecting circuit 32 for detecting the intake pressure, an ignition timing setting circuit 34 for determining an ignition timing $\theta_M$, a correction circuit 35 responsive to a knock signal to correct the ignition timing, and a primary coil control circuit 36 responsive to the output of the ignition timing correction circuit 35 to switch on and off the current flow in the primary coil of the ignition coil. As shown in FIG. 5, the primary coil control circuit 36 comprises a constant setting means 362, a subtractor circuit 361 connected to the correction circuit 35 and the constant setting means 362 to obtain a difference $A-\theta$ from the ignition timing $\theta$ and a constant A, a latch 363 for storing the output of the subtractor circuit 361, a counter 365 for counting angle signals $CL\theta$, a comparator 364 responsive to the outputs of the latch 363 and the counter 365 to determine the time of interrupting the flow of current in the primary coil, a constant setting means 366 for setting a constant D which determines the duration of current flow in the primary coil, a subtractor 367 responsive to the constant D and the output of the subtractor 361 to produce a difference $A-\theta-D$, a latch 368 for storing the output of the subtractor 367, a counter 3610 for counting angle signal $CL\theta$, a comparator 369 responsive to the outputs of the latch 368 and the counter 3610 to determine the time of starting the flow of current in the primary coil, and a flip-flop circuit 3611 responsive to the outputs of the comparators 364 and 369 to generate a primary coil energization signal, and its output 36a is connected to the input of the ignition device 4 to energize the ignition coil.

Figure 7:
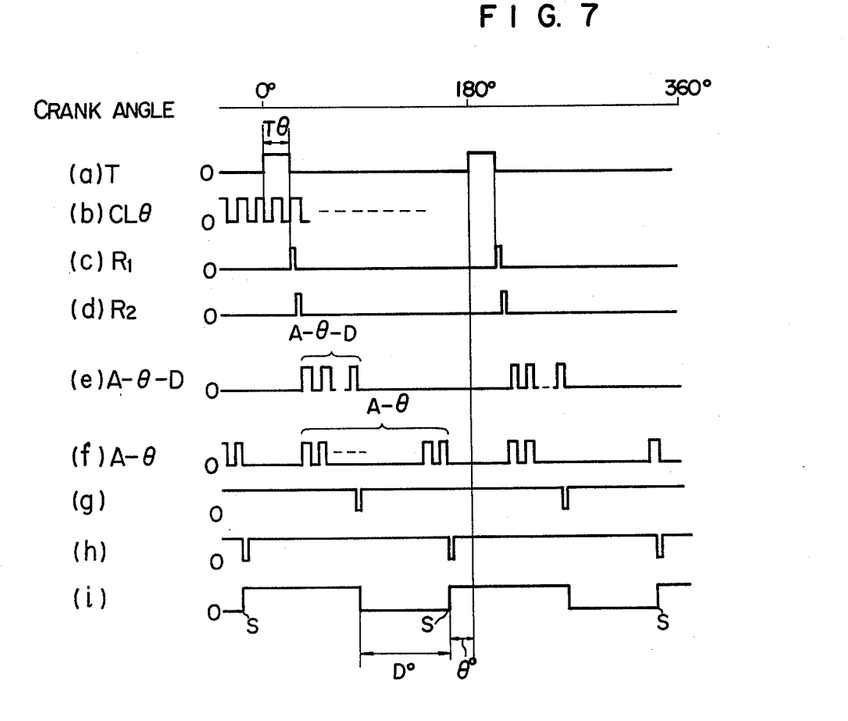
FIGS. 7 and 8 are time charts useful for explaining the operation of the apparatus shown in FIGS. 4 to 6.

Next, the operation of the apparatus excluding the knock control circuit 6 will be described with reference to the time chart of FIG. 7. The angle detector 1 generates from the top dead center of each cylinder two reference signals whose width is the angle $T\theta$ for each revolution of the crankshaft and one angle signal for every 1° crankshaft rotation as shown in (a) and (b) of FIG. 7. In the ignition timing computing circuit 3 the first detecting circuit 31 receives timing signals t and a reference signal T from the timing control circuit 33 so that the timing signals t are counted during the time that the reference signal T is at a "1" level and then a reciprocal of the count is obtained, thus digitally computing the engine speed N. In this case, since each reference signal T is generated for every half engine revolution, the engine speed N (binary coded) is generated for every half engine revolution in response to a reset signal $R_1$ generated from the timing control circuit 33 as shown in (c) of FIG. 7. The second detecting circuit 32 operates in such a manner that the output of the intake pressure detector 2 corresponding to the intake pressure is subjected to A/D conversion and the resulting intake pressure P (binary coded) is generated in response to the reset signal $R_1$ in the like manner as the engine speed N. The outputs N and P of the first and second detecting circuits 31 and 32 are applied to the ignition timing setting circuit 34 which in turn determines an ignition timing $\theta_M$. The setting circuit 34 comprises a read-only memory (hereinafter referred to as a ROM) and the values shown in the maps divided according to the engine speed N and the intake vacuum P are preliminarily programmed into the ROM, as for example, it is programmed so that with the intake vacuum P in the range 0 to −60 mm Hg, 8° BTDC is selected for the engine speed N in the range 1200 to 1400 rpm, 9° BTDC for the range 1400 to 1600 rpm, 10° BTDC for the range 1600 to 1800, . . . , with the intake vacuum P in the range −120 to −180 mm Hg, 10° BTDC for the engine speed N in the range 1200 to 1400 rpm, 11° BTDC for the range 1400 to 1600 rpm, . . . , and these programmed values are set to the optimum ignition timing characteristic (MBT). In this case, greater the number of divisions of the programmed values the more excellent results will be obtained in terms of accuracy, and the capacity of the ROM is increased correspondingly. In such a case, the required ROM capacity can be reduced by interconnecting the programmed points with a straight line and using interpolation. For example, it is only necessary to arrange so that in the previously mentioned case, in the range 0 to −60 mm Hg, 8° BTDC is programmed at 1200 rpm, 12° BTDC at 1800 rpm and the following calculation is performed $$\theta = \frac{12 - 8}{1800 - 1200} \times N + 8°$$

Then, the output $\theta_M$ of the ignition timing setting circuit 34 is corrected by an output $\theta_K$ of the knock control circuit 6 in the correction circuit 35 which computes and applies the final ignition timing $\theta = \theta_M + \theta_K$ to the primary coil control circuit 36. The subtractor circuit 361 generates an output $(A - \theta)$ from the constant A and the ignition timing $\theta$ and the subtractor circuit 367 generates an output $(A - \theta - D)$ from the former output and the constant D. These outputs are respectively stored in the latches 363 and 368 in response to the reset signal $R_2$ shown in (d) of FIG. 7. In this case, the counters 365 and 3610 are also reset in response to the reset signal $R_2$ and thereafter the angle signals $CL\theta$ are counted up by these counters. Consequently, when the count of the angle signals $CL\theta$ attains the $A - \theta - D$ as shown in (e) of FIG. 7, the comparator 369 generates the energization starting negative pulse shown in (g) of FIG. 7, and similarly when the count of the angle signals $CL\theta$ attains the $A - \theta$ as shown in (f) of FIG. 7 or at the intersection of the solid line and the broken line in (i) of FIG. 8, the comparator 364 generates the deenergizing negative pulse shown in (h) of FIG. 7. Consequently, the flip-flop 3611 generates a waveform which goes to the "0" level in response to the negative pulse (g) and which goes to the "1" level in response to the negative pulse (h). Thus, when the signal (i) goes to the "0" level, the primary winding of the ignition coil is energized (the primary winding circuit is closed) and the flow of current in the ignition coil is interrupted at a time S at which the signal (i) goes to the "1" level. As a result, a high voltage is generated in the secondary winding of the ignition coil and the high voltage is distributed to the spark plugs in the respective cylinders.

In this embodiment the angle signals $CL\theta$ each corresponds to 1° crank angle and the count of the signals represents a crank angle itself. In other words, the times of the pulses (g) and (h) in FIG. 7 respectively represent $(A - \theta - D)°$ and $(A - \theta)°$ from the negative going transistion of the reset signal $R_2$. Since the time interval from the negative transition of the signal T to the sum of that of the reset signal $R_2$ and the spark advance computing time is less than 1°, if the set value A is given by $(180 - T\theta)$, then the spark advance is $\theta°$ and consequently the angle represented by the "0" level of the pulse (i) or the ignition coil energization angle becomes $D°$.

Where a longer time is required for reading a spark advance angle corresponding to the engine speed N and the intake vacuum P from the ROM and for the computation of the spark advance angle subjected to knock correction, it is only necessary to reset the counters 365 and 3611 at a time which is delayed a predetermined angle $\theta'$ from the negative transition of the reference signal T, and in this case the set value A may be selected $A = 180 - T\theta - \theta'$.

Figure 6:
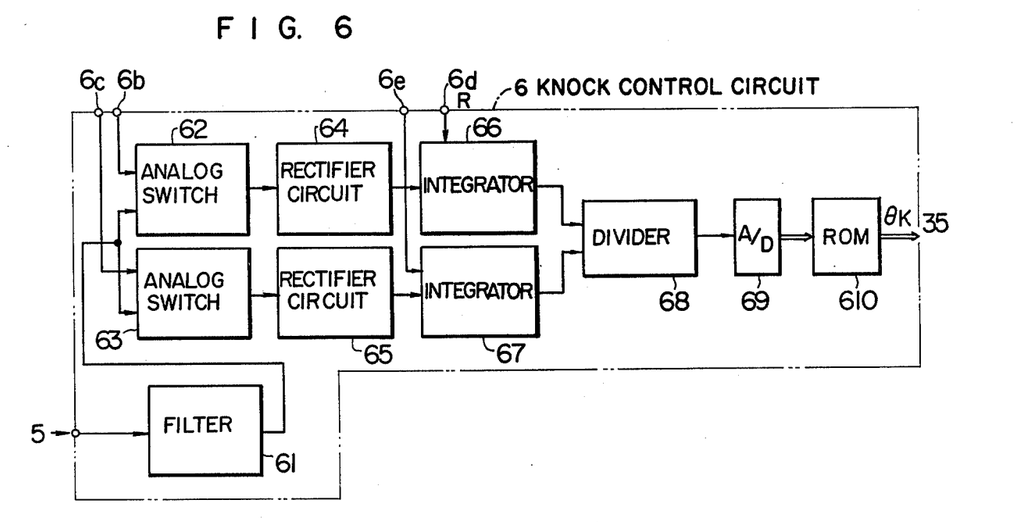

Next, the knock control circuit 6 will be described. In FIG. 6 showing a block diagram of the circuit, numeral 61 designates a filter such as a band-pass filter or low-pass filter etc., which is connected to the vibration detector 5 to select and transmit knock frequency components from the vibration acceleration or cylinder pressure variation. Numerals 62 and 63 designate analog switches connected to the filter 61 to pass the knock signals from the filter 61 in response to the application of a "1" level signal to their control inputs 6b and 6c, respectively. A fixed angle signal before and after the maximum indicated pressure position is applied to the control terminals 6b and 6c, respectively. Numerals 64 and 65 designate rectifier circuits, 66 and 67 integrators each adapted to integrate the knock signals to obtain the average value thereof, 68 a divider to obtain the ratio between the knock signals before and after the maximum indicated pressure position, 69 an A/D converter, and 610 an ROM from which is read out a correction spark angle $\theta_K$ corresponding to the knock ratio.

The operation of the knock control circuit 6 will now be described with reference to the timing chart of FIG. 8.

Figure 8:
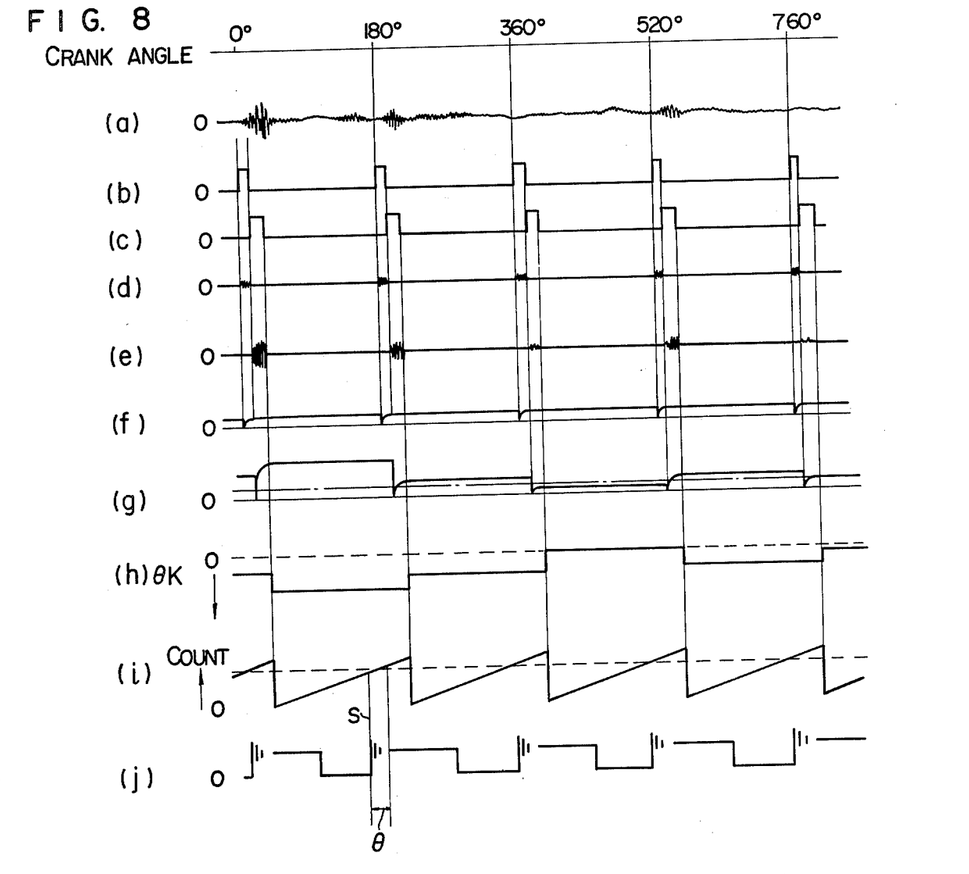
Figure 9:
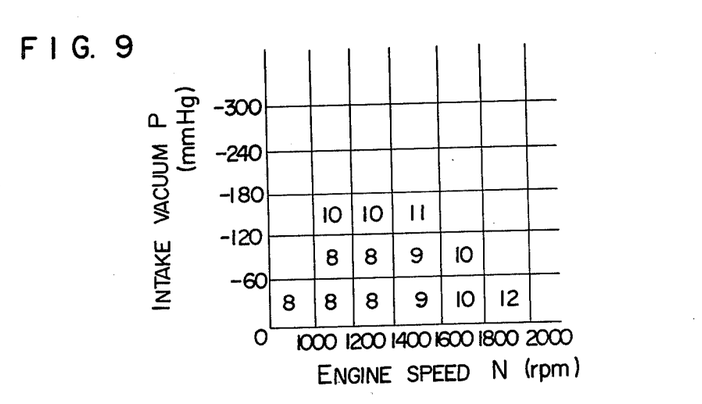
FIG. 9 is a diagram showing an ignition timing program for the apparatus shown in FIG. 4.

Shown in (a) of FIG. 8 is the output waveform of the filter 61, and shown in (b) and (c) of FIG. 8 are the fixed angle signals before and after the maximum indicated pressure position which are applied to the control input terminals 6b and 6c.

Figure 3A:
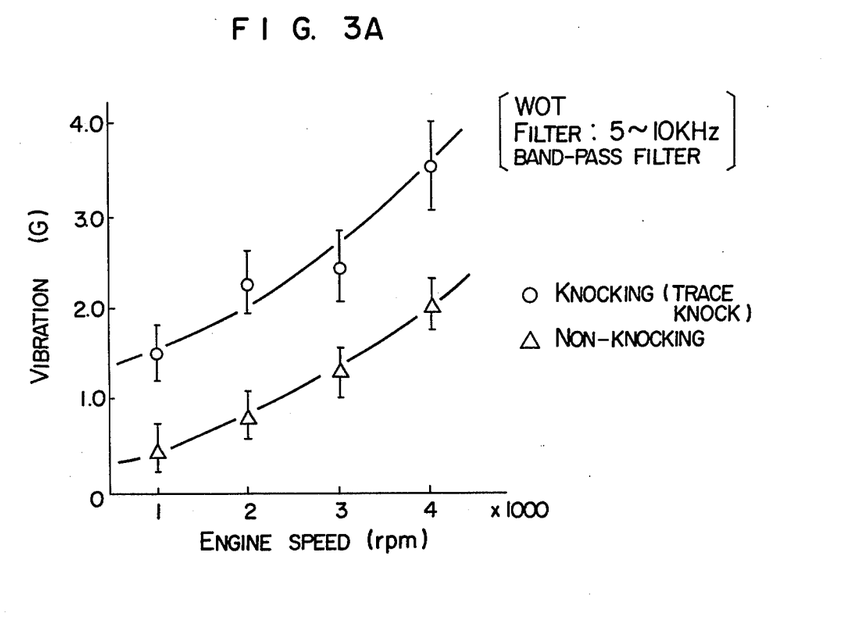
FIGS. 3A and 3B are characteristic diagrams showing the relationship between the engine conditions and knock intensity.
Figure 3B:
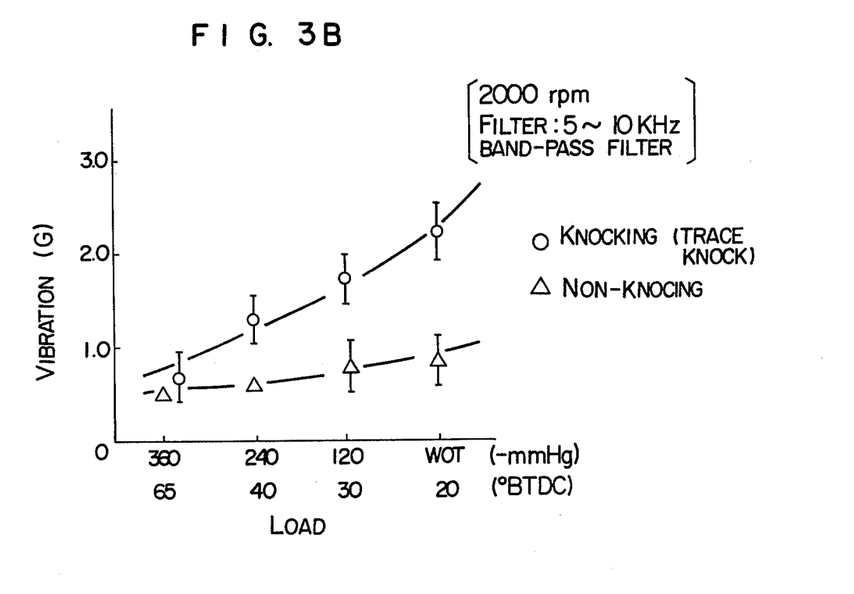

When the signal in (b) of FIG. 8 is at the "1" level, the analog switch 62 is turned on. In this case, there are practically no knock frequency components and the level of disturbance noise (the vibration factor involved in the engine vibration, vehicle body vibration, etc., and having a tendency to increase with an increase in the engine speed as shown in FIGS. 3A and 3B) is sampled as shown in (d) of FIG. 8. Similarly, during the time that the signal in (c) of FIG. 8 is at the "1" level the knock signal frequency components (the amplitude increases as the knock develops from the trace knock to the heavy knock) are sampled as shown in (e) of FIG. 8. The sampled signals (alternating currents) are respectively rectified by the rectifier circuits 64 and 65 and are then integrated by the integrators 66 and 67 which produce and hold the average knock levels as shown in (f) and (g) of FIG. 8. In this case, in response to the positive transition of the signals shown in (b) and (c) of FIG. 8, a pulse signal which is not shown is applied to terminals 6d and 6e, respectively, to reset the values previously held by the integrators 66 and 67. The divider 68 produces the ratio (g)/(f) from the output signals (f) and (g) of the integrators 66 and 67 and a spark advance correction amount is determined which retards the ignition timing when the ratio is greater than a predetermined value and which advances the ignition timing when the ratio is smaller than the predetermined value. More specifically, the output of the divider 68 is converted to a digital quantity by the A/D converter 69 so that the corresponding correction spark angle $\theta_K$ is read from the ROM 610 and the correction spark angle $\theta_K$ as shown in (h) of FIG. 8 is determined. The correction spark angle $\theta_K$ is then applied to the correction circuit 35 and the ignition timing $\theta = \theta_M + \theta_K$ is obtained to effect the ignition.

Usually, when the ignition timing is near the MBT, the maximum indicated pressure value occurs at around 15° crank angle ATDC. As a result, the knock frequency components are generated after the maximum indicated pressure position. With the present embodiment, the sampling in (b) and (c) of FIG. 8, respectively, is synchronized with the angle so that the sampling (b) of FIG. 8 corresponds to a predetermined angle, as for example, 10° crank angle in the angle from the ignition position to 15° crank angle ATDC and the sampling (c)

of FIG. 8 corresponds to 10° crank angle in the angle from 15° crank angle ATDC to 40° crank angle ATDC, thus detecting the occurrence of knock before and after the maximum pressure value. The signals (b) and (c) of FIG. 8 are produced by the timing control circuit 33 in response to the signals T$\theta$ and CL$\theta$ and the timing signals so as to determine their width corresponding to a predetermined angle.

It has been found experimentally that where the vibration detector 5 is used which is adapted to detect vibration acceleration, knocking components are continuously generated during the time interval from 15° crank angle ATDC to 80° crank angle ATDC, and in this case the detection range of the signal (c) of FIG. 8 can be increased.

On the other hand, the divider 68 includes an output limiter so that the ratio (g)/(f) is limited for example to a ratio output value between the maximum value of 3 to 5 and the minimum value of about 0.1. In other words, a limitation is placed on the correction spark advance $\theta_K$ and the ignition timing according to the MBT characteristic $\theta_M$ is subjected to spark advance correction in one direction within a predetermined range. In this way the ignition timing is controlled to the optimum position. As a result, irrespective of the atmospheric conditions, temperature, etc., the engine is always controlled to the optimum ignition timing with the resulting improvement in the fuel consumption and torque.

Figure 10:
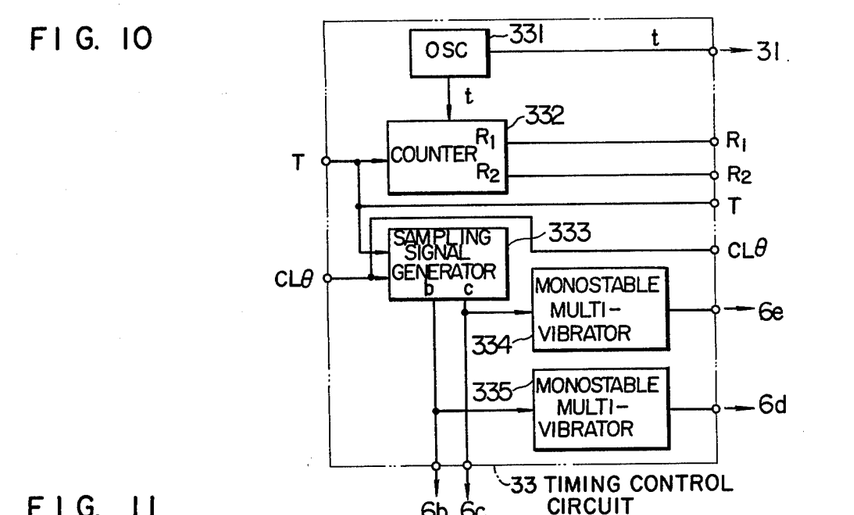

The construction of the timing control circuit 33 is shown in FIG. 10, in which numeral 331 designates an oscillator for generating timing signals t, 332 a counter responsive to the timing signals t and the reference signal T os a predetermined angle width to generate sampling reset signals R$_1$ and R$_2$, 333 a sampling signal generator for generating the knock data sampling signals shown in (b) and (c) of FIG. 8, whereby the angle signals CL$\theta$ are counted in response to the reference signal T to generate the signals of a predetermined angle width for sampling knock signals. Numerals 334 and 335 designate monostable multivibrators respectively adapted to receive the sampling signals shown in (b) and (c) of FIG. 8 and generate timing signals of a predetermined short time width just sufficient to reset the integrated value of the integrators 66 and 67.

While, in the above described embodiment, the knock signals before and after the maximum indicated pressure value are synchronized with the sampling angle signals and the correction value $\theta_K$ is linearly changed in response to the knock levels, the similar effects may be obtained in the following manner.

The maximum indicated pressure value angle is first obtained from the indicated cylinder pressure waveform through a low-pass filter, peak detector or the like, and a correction spark angle $\theta_K$ is determined in accordance with the ratio between the sampled value of the knock frequency components during a predetermined angle after the detected maximum value angle and that obtained during a predetermined angle immediately after an ignition signal. In this case, with the timing control circuit 33 of FIG. 10 it is necessary to replace the sampling signal generator 333 with a circuit of the construction shown in FIG. 11. In the Figure, numeral 3331 designates a low-pass filter connected to the vibration detector 5 which detects variations in the cylinder pressure so as to remove the harmonic components from the indicated pressure waveform, 3332 a peak detector for detecting the indicated pressure waveform maximum value angle, 3333 a monostable multivibrator responsive to the detection of the maximum pressure by the peak detector 3332 to count the angle signals CL$\theta$ and thereby to generate a "1" level signal of a predetermined angle width, and 3334 another monostable multivibrator connected to the output of the comparator 364 and responsive to the generation of an ignition signal to generate a "1" level signal of a predetermined angle width in the like manner as the monostable multivibrator 3333, and the outputs of the monostable multivibrators 3333 and 3334 are connected respectively to the terminals 6b and 6c to generate the knock signals before and after the maximum indicated pressure value.

Figure 11:
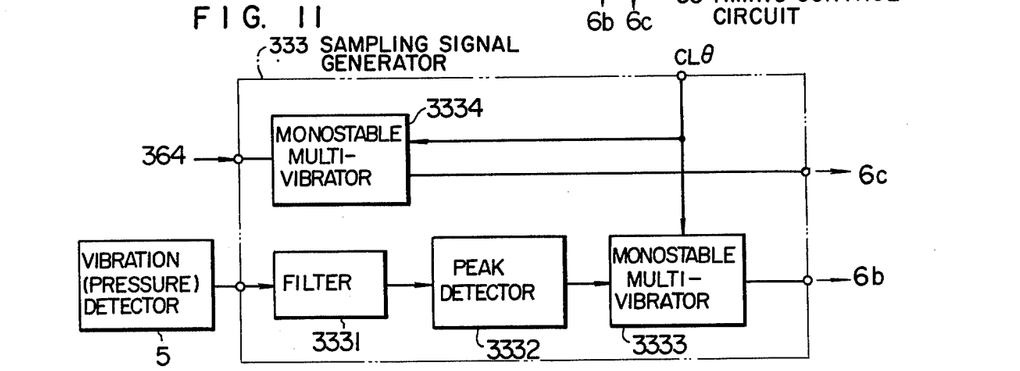
FIG. 11 is a circuit diagram showing another embodiment of the part shown by the circuit diagram of FIG. 10.

Further, while, in the embodiment of FIG. 11, the value obtained during the predetermined value after the ignition position is used as a comparison value, the similar effects may be obtained by applying the output of the comparator 369 or the energization start timing signal to the input of the monostable multivibrator 3334. Still further, by applying the timing clock signals t in place of the angle signal CL$\theta$ to the monostable multivibrators 3333 and 3334 as their input for counting, it is possible to obtain a knock waveform during a predetermined time width before and after the maximum indicated pressure value, respectively.

Figure 12:
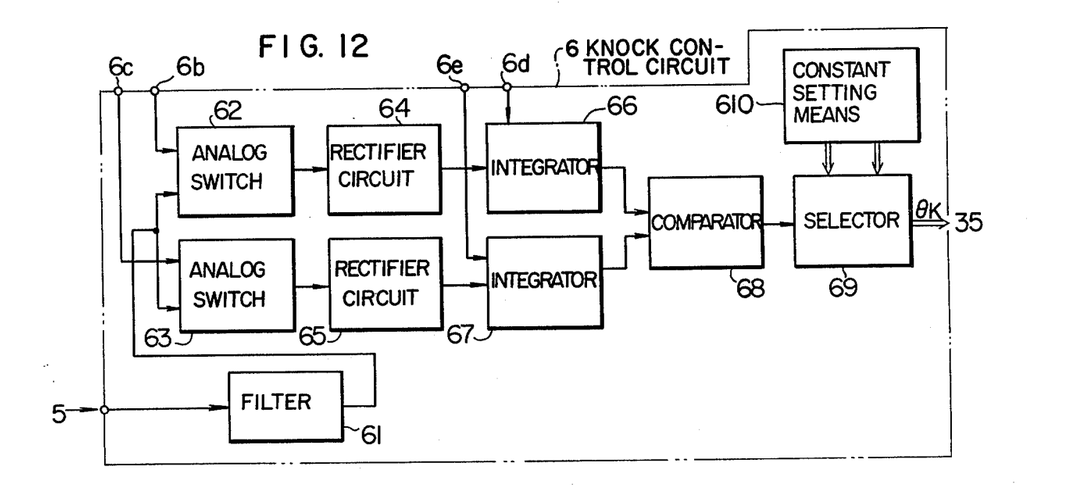
FIGS. 12 and 13 are circuit diagrams showing another embodiments of the circuit shown in FIG. 6.

On the other hand, the knock control circuit 6 may be designed to detect knock by means of two values, that is, knock is present and knock is not present. FIG. 12 is another embodiment of the knock control circuit 6 which is adapted to detect knock by means of two values, and in the Figure the same reference numerals as used in FIG. 6 designate the same component parts. Numerals 66' and 67' designate integrators each having an amplifying function and the amplification factor of the integrator 66' is selected 2 to 5 times that of the integrator 67'. Numeral 68' designates a comparator for comparing the outputs of the integrators 66' and 67' as to relative magnitude whereby a "0" level signal indicative of non-knocking condition or condition that knocking is not present is generated when the output of the integrator 66' is greater than that of the integrator 67' and a "1" level indicative of knocking condition or condition that knocking is present is generated when the output of the integrator 66' is smaller than that of the integrator 67'. Numeral 69' designates a selector responsive to the output of the comparator 68' to select one or the other of the two constants of a constant setting means 610' whereby a correction spark angle $\theta_K$ for advancing or retarding the ignition timing is generated and it is applied to the ignition timing correction circuit 35. As a result, the desired spark advance correction value can be easily obtained as one or the other of the two values of advance and retard, and the knock detection ratio is usually selected in the range of 2 to 5 times, although it can be selected as desired depending on the amplification factors of the integrators 66' and 67'.

Further, while, in the above-described embodiment, the detection of knock is effected for each half revolution of the engine, it is possible to detect and control in terms of the average value of knocks or alternatively it is possible to control the change of the correction value once for every several revolutions of the engine.

Figure 13:
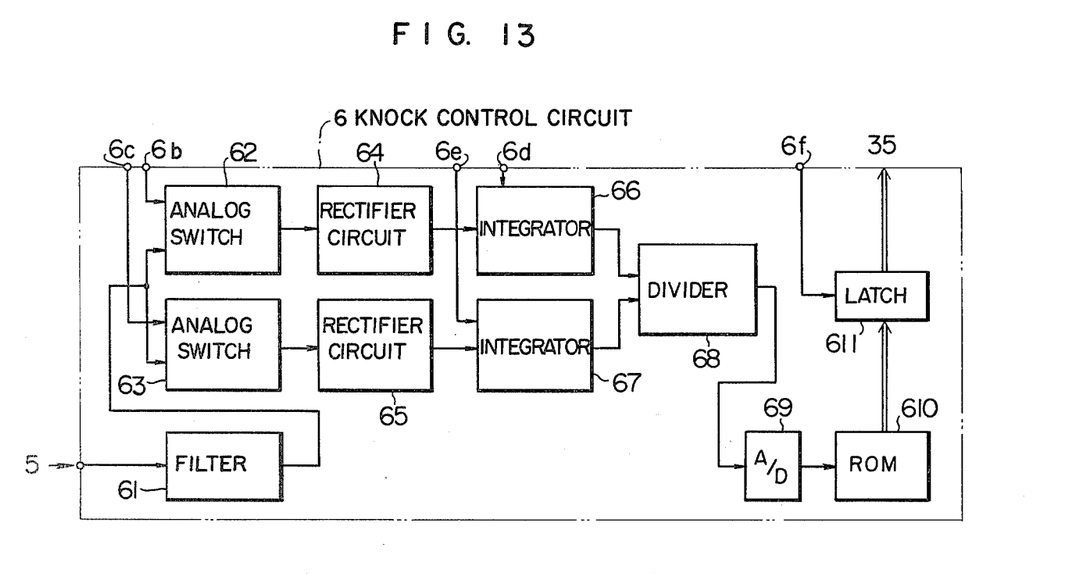
Figure 14:
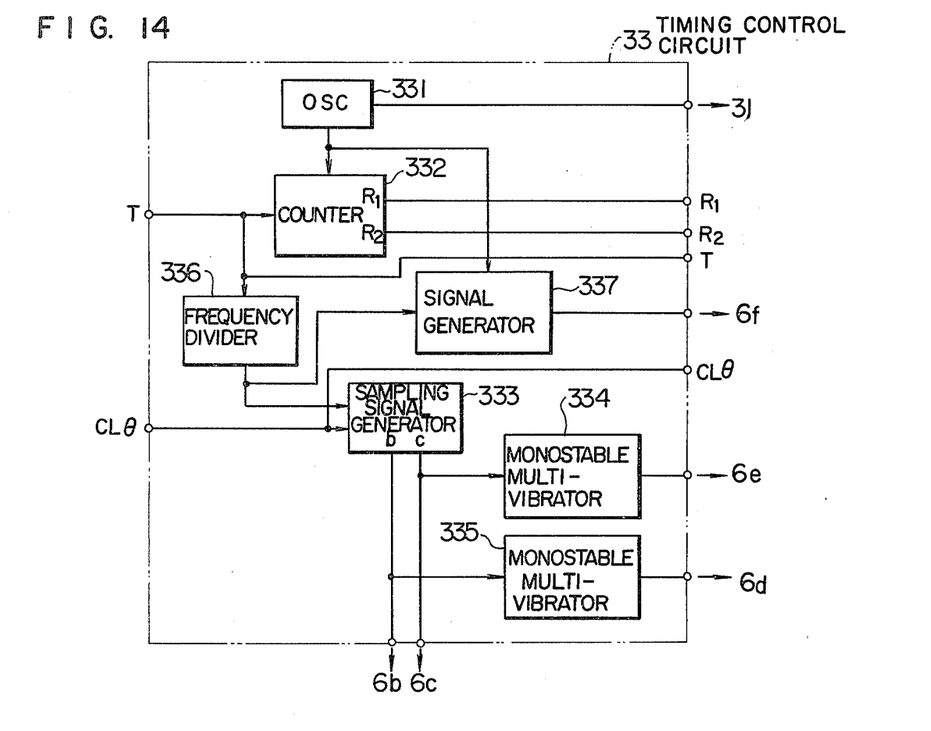
FIG. 14 is a circuit diagram showing still another embodiment of the circuit shown in FIG. 10.

FIGS. 13 and 14 respectively show another embodiment of the knock control circuit 6 and the timing control circuit 33 which are adapted to this purpose, and in FIG. 13 the same reference numerals as used in FIG. 6 designate the same component parts. The output of a ROM 610 is connected to a temporary storage latch 611 and a signal is applied to a memory terminal 6f for every n revolutions of the engine for example, thus changing the correction spark angle $\theta_K$ only in response to each applied signal.

In FIG. 14 the same reference numerals as used in FIG. 10 designate the same component parts. Numeral 336 designates a frequency divider for receiving reference signals T to generate an output for every 2n reference signals T received, and 337 a signal generator connected to the output of the timing signal generator 331 and the frequency divider 336, respectively, to generate a latch signal of a predetermined time width. In this way, the latch 611 is allowed to change the knock correction angle $\theta_K$ for every n revolutions of the engine. On the other hand, by connecting a frequency divider to the monostable multivibrators 334 and 335 of FIG. 14 so as to apply a signal to the signal terminals 6e and 6d, respectively, for every n revolutions, it is possible to reset the integrated value of the integrators 66 and 67, respectively, once for every n revolutions of the engine and thereby to determine the correction angle $\theta_K$ according to the average value of n knock waveforms. Further, by applying a signal to the signal terminals 6b and 6c for every n revolutions, it is possible to set the number of times of sampling and thereby to effect the sampling.

While, in FIG. 6, the integrators 66 and 67 may each be replaced with a peak value holding circuit so as to detect the occurrence of knock from the vibration peak value detected by the vibration detector 5 during a predetermined angle width or a predetermined time width after the maximum pressure value, this is not preferable in that there is possibility of the peak value holding circuit holding a noise signal as the peak value of vibrations thus making it impossible to detect the occurrence of knock accurately.

Further, while, in the above-described embodiment, the vibration of an engine is detected from the acceleration of vibration of the engine or the variations of the engine cylinder pressure, it is possible to detect the engine vibration as vibration sound by a microphone.

We claim:

1. An apparatus for controlling timing of ignition sparks supplied to an internal combustion engine having an output shaft rotated by the combustion of mixture comprising:

first position detecting means for producing a first position signal in synchronized relation with the arrival of said output shaft at a predetermined reference position;

computing means for computing an ignition spark angle relative to the timing of said first position signal in response to operating conditions of said internal combustion engine;

igniting means for supplying said internal combustion engine with an ignition spark in synchronized relation with the arrival of said output shaft at said ignition spark angle;

second position detecting means for producing a second position signal in synchronized relation with the arrival of said output shaft at a position where a pressure of combustion caused by said ignition spark attains substantially a maximum value;

knock detecting means for producing knock signals having magnitudes proportional to respective intensities of knocks of said internal combustion engine;

first integrating means for integrating said knock signals;

second integrating means for integrating said knock signals;

interval control means for limiting the operations of said first integrating means to respective first and second predetermined intervals which are present before and after said second position signal, respectively;

dividing means for dividing a second output of said second integrating means by a first output of said first integrating means; and correcting means for correcting said ignition spark position in response to an output of said dividing means.

2. An apparatus according to claim 1, wherein said correcting means includes a read only memory for storing spark ignition position correction values corresponding to values of quotient obtained by dividing said second output by said first output, and said ignition spark position is corrected by a correction value read out of said read only memory in response to an output of said dividing means.

3. An apparatus for controlling timing of ignition sparks supplied to an internal combustion engine having an output shaft rotated by the combustion of mixture comprising:

first position detecting means for producing a first position signal in synchronized relation with the arrival of said output shaft at a predetermined reference position;

computing means for computing an ignition spark angle relative to the timing of said first position signal in response to operating conditions of said internal combustion engine;

igniting means for supplying said internal combustion engine with an ignition spark in synchronized relation with the arrival of said output shaft at said ignition spark angle;

second position detecting means for producing a second position signal in synchronized relation with the arrival of said output shaft at a position where a pressure of combustion caused by said ignition spark attains substantially a maximum value;

knock detecting means for producing knock signals having magnitudes proportional to respective intensities of knocks of said internal combustion engine;

first integrating means for integrating said knock signals;

second integrating means for integrating said knock signals;

interval control means for limiting the operations of said first and second integrating means to respective first and second predetermined intervals which are present before and after said second position signal, respectively;

dividing means for dividing a second output of said second integrating means by a first output of said first integrating means;

counting means for counting said first position signal, said counting means producing a count output when a count value reaches a predetermined value; and correcting means for correcting said ignition spark position in response to an output of said dividing means each time said count output is produced.

4. An apparatus according to claim 3, wherein said correcting means includes a read only memory for storing spark ignition position correction values corresponding to values of quotient obtained by dividing said second output by said first output, and said ignition spark position is corrected by a correction value read out of said read only memory in response to an output of said dividing means.

* * * * *